(12) United States Patent
Cros et al.

(10) Patent No.: US 12,435,468 B2
(45) Date of Patent: Oct. 7, 2025

(54) DEICING DEVICE FOR A SHEATH OF A STRUCTURAL CABLE AND A METHOD FOR DEICING A STRUCTURAL CABLE

(71) Applicant: SOLETANCHE FREYSSINET, Rueil Malmaison (FR)

(72) Inventors: Emmanuel Cros, Paris (FR); Miklos Toth, Les Lilas (FR)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 1009 days.

(21) Appl. No.: 17/594,937

(22) PCT Filed: May 14, 2019

(86) PCT No.: PCT/IB2019/000598
§ 371 (c)(1),
(2) Date: Nov. 3, 2021

(87) PCT Pub. No.: WO2020/229867
PCT Pub. Date: Nov. 19, 2020

(65) Prior Publication Data
US 2022/0220669 A1    Jul. 14, 2022

(51) Int. Cl.
| | | |
|---|---|---|
| *E01D 19/00* | (2006.01) | |
| *B08B 7/02* | (2006.01) | |
| *D07B 1/14* | (2006.01) | |
| *D07B 1/16* | (2006.01) | |
| *E01D 19/16* | (2006.01) | |
| *E04H 12/20* | (2006.01) | |

(52) U.S. Cl.
CPC .............. *D07B 1/14* (2013.01); *B08B 7/02* (2013.01); *D07B 1/162* (2013.01); *D07B 2401/203* (2013.01); *D07B 2401/204* (2013.01); *D07B 2501/203* (2013.01); *E01D 19/16* (2013.01); *E04H 12/20* (2013.01)

(58) Field of Classification Search
CPC .... D07B 1/14; D07B 1/162; D07B 2401/203; D07B 2401/204; D07B 2501/203; B08B 7/02; E01D 19/16; E04H 12/20
USPC ........................................................ 14/18, 22
See application file for complete search history.

(56) References Cited

U.S. PATENT DOCUMENTS

| | | | | |
|---|---|---|---|---|
| 3,909,341 A | * | 9/1975 | Moscovita ............. | B29D 30/42 156/304.6 |
| 5,411,121 A | * | 5/1995 | LaForte .................. | H02G 7/16 174/40 R |

(Continued)

FOREIGN PATENT DOCUMENTS

| | | |
|---|---|---|
| EP | 1980667 A2 | 10/2008 |
| WO | 2018142174 A1 | 8/2018 |
| WO | 2019064042 A1 | 4/2019 |

OTHER PUBLICATIONS

International Search Report and Written Opinion issued in PCT/IB2019/000598, dated Jan. 30, 2020.

*Primary Examiner* — Raymond W Addie
(74) *Attorney, Agent, or Firm* — HSML P. C.

(57) ABSTRACT

A deicing device for a sheath of a structural cable, the structural cable comprising tendons housed in the sheath, the deicing device includes a base; a bearing element; and a power system configured to press the bearing element against the tendons while the base is in contact with an inner surface of the sheath, and to generate vibrations between the bearing element and the base.

15 Claims, 5 Drawing Sheets

(56) References Cited

U.S. PATENT DOCUMENTS

| | | | | |
|---|---|---|---|---|
| 6,518,497 B1* | 2/2003 | Allaire | ................... | H02G 7/16 |
| | | | | 174/40 R |
| 10,113,278 B1 | 10/2018 | Carney | | |
| 11,686,055 B2* | 6/2023 | Aveline | ................... | D07B 1/16 |
| | | | | 428/375 |

* cited by examiner

DEICING DEVICE FOR A SHEATH OF A STRUCTURAL CABLE AND A METHOD FOR DEICING A STRUCTURAL CABLE

The present invention relates to a deicing device for a sheath of a structural cable. The present invention also relates to a method for deicing a sheath with such a deicing device. Structural cables are used in civil engineering, for instance in cable-stayed bridges. It is applicable, in particular, to the sheath of such cables used for supporting, stiffening or stabilizing structures.

BACKGROUND

Stay cables are widely used to support suspended structures such as bridge decks or roofs. They can also be used to stabilize erected structures such as towers or masts.

A typical stay cable includes a bundle of tendons, for example wires or strands, housed in a collective sheath. The sheath is intended to protect the metallic tendons of the bundle.

By design, the sheath is destined to be in contact with the surrounding environment. As such, it is susceptible to the formation of frost, rime, ice or snow thereon.

Addressing this phenomenon is important, as the presence of frost, rime, ice or snow on the sheath may significantly alter the aerodynamic properties of the stay cable, which in turn may lead to vibrations of the cable. Ice chunks falling from the cables may also cause problems.

Several approaches have been developed to address this, such as an approach relying on a metallic collar configured to break ice and frost by being moved along the sheath. However, this is not fully satisfactory, as it tends to erode the sheath, and it may become unusable in certain circumstances.

Another approach is known from document WO 2019/064042 A1 wherein the sheath comprises heating components. However, the solution disclosed in that document is not applicable to example to cables already mounted on bridges.

Document WO 2018/142174 A discloses a sheath with a cavity that may receive a vibration module to break superficial ice or frost deposits.

In addition, document U.S. Pat. No. 10,113,278 B1 discloses a module for deicing a cable sheath with a mass and a vibrator. This solution causes vibrations along the cable that removes the ice or snow covering the cable. However, the vibrating mass may hit the tendons of the cable and damage them. Also, such solution requires a lot of power.

SUMMARY

An object of the present invention is to propose a deicing device for a sheath of a structural cable that can remove ice, frost, rime or snow therefrom in an improved manner. To that end, the invention relates to a deicing device for a sheath of a structural cable, the structural cable comprising tendons housed in the sheath, the deicing device comprising a base, a bearing element, and a power system configured to press the bearing element against the tendons while the base is in contact with an inner surface of the sheath.

It results that the deicing device is firmly supported on the tendons. In addition, the pressure exerted on the tendons causes a local deformation of the sheath which can then cause a temporary and reversible shape change of the section of the sheath which may lead of local detachment of the ice for ejection.

The deicing device thus prevents damage to the tendons by clamping the movements of the base before activation of the vibrator. Furthermore, the vibrations are transmitted optimally to the sheath through the base with low energy dissipation.

In an embodiment, the deicing device includes a power system is further configured to generate vibrations between the bearing element and the base.

In another embodiment, the bearing element is movable in a direction perpendicular to the inner surface of the sheath, with a stroke in a range of 3 to 75 mm.

The power system may comprise an actuator for the movement of the bearing element in the perpendicular direction, the actuator being fixed to the base and to the bearing element.

In another embodiment, the base has a convex surface facing the inner surface of the sheath, the convex surface having a curvature larger than a curvature of the inner surface of the sheath.

In another embodiment, the power system comprises a vibrator generating vibrations in a range of 50 to 5000 Hz.

In another aspect, there is proposed a structural cable comprising a sheath, tendons housed in the sheath, and at least one deicing device.

In another aspect, there is proposed a method for deicing a sheath of a structural cable of a construction work, the structural cable comprising tendons housed in the sheath. The method comprises inserting a deicing device within the sheath of the structural cable, the deicing device comprising a base and a bearing element, pressing the bearing element against the tendons while the base is in contact with an inner surface of the sheath.

Pressing the bearing element against the tendons may comprise moving the bearing element in a direction perpendicular to an inner surface of the sheath.

The method for deicing may also comprise generating vibrations in the deicing device during 1 to 15 seconds.

Pressing the bearing element against the tendons may comprise applying a pressure pulse by the bearing element.

The method for deicing may also comprise displacing the deicing device along the sheath, and pressing again the bearing element against the tendons while the base is in contact with an inner surface of the sheath at another position along the sheath.

When the method for deicing comprises displacing the deicing device along the sheath, and pressing again the bearing element against the tendons while the base is in contact with an inner surface of the sheath at another position along the sheath, the deicing device may be displaced over a distance greater than a length of the deicing device.

BRIEF DESCRIPTION THE DRAWINGS

Other features and advantages of the deicing device disclosed herein will become apparent from the following description of non-limiting embodiments, with reference to the appended drawings, in which.

DESCRIPTION OF EMBODIMENTS

Figure 1:
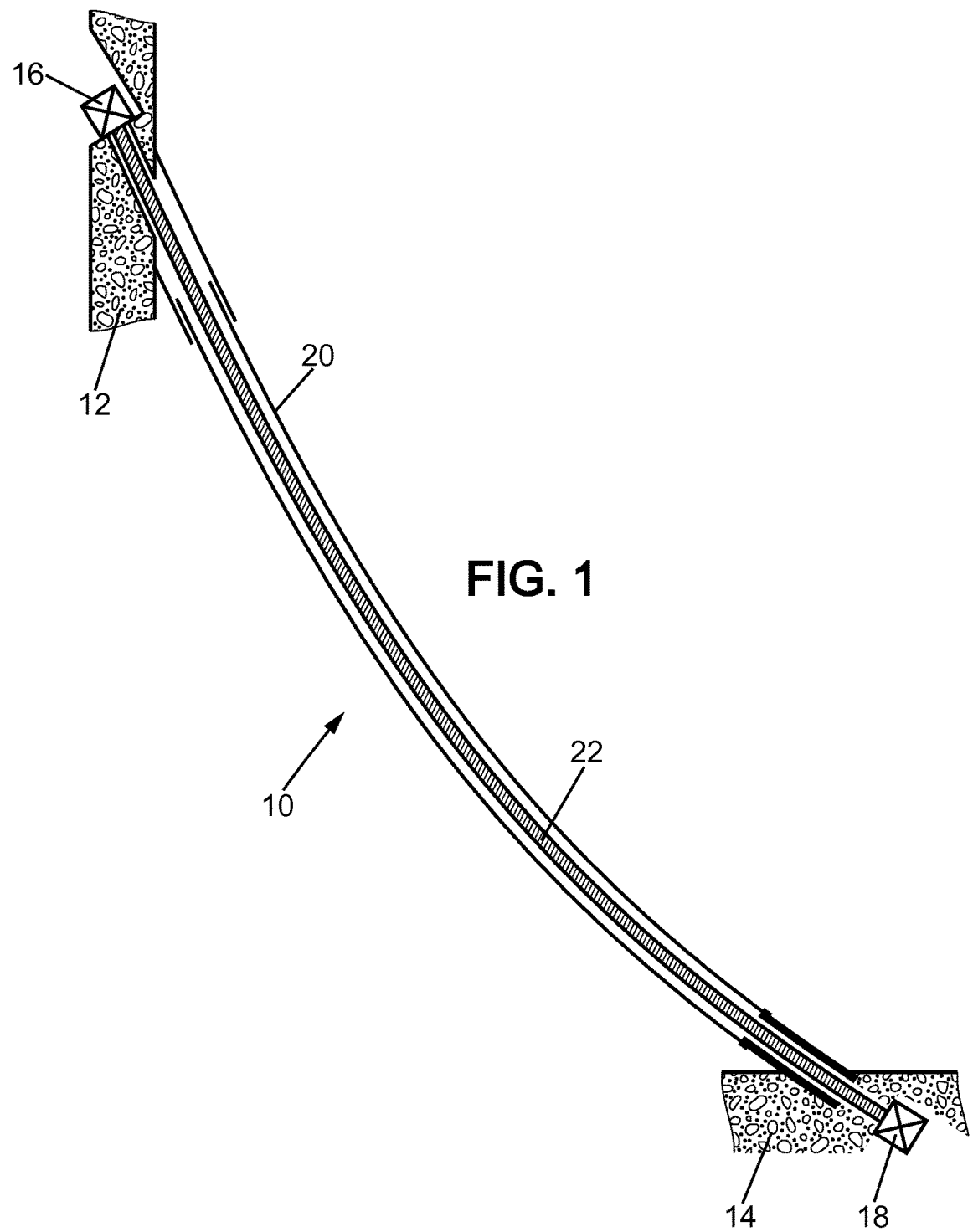
FIG. 1 is a schematic side view of a stay cable.

FIG. 1 shows a structural cable 10 that may be equipped with a sheath 20 according to the invention.

The cable 10 is, for example, a stay extending along an oblique path between first and second parts 12, 14 where it is anchored using respective anchoring devices 16, 18. The stay cable is used to suspend the second part 14 (e.g., a bridge deck) from the first part 12 (e.g., a pylon), or to stabilize a tall structure forming the first part 12 from the ground or some lower structure forming the second part 14.

Figure 2:
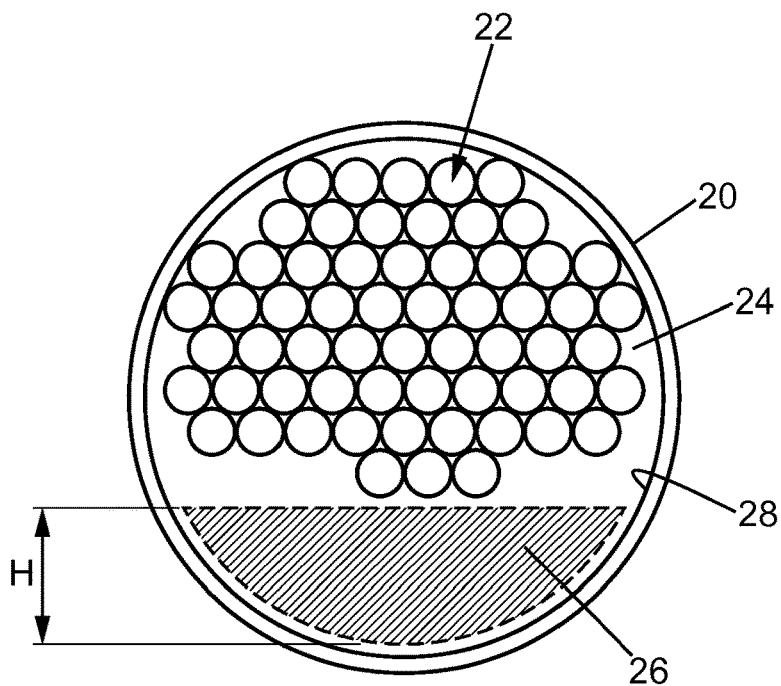
FIG. 2 is a cross-sectional view of a stay cable.

The structural cable 10 comprises tendons 22 disposed parallel to each other (FIG. 2) and contained in a collective sheath 20. For example, the tendons may be steel strands each protected by a substance such as grease or wax and individually contained in a respective plastic sleeve.

The collective sheath 20 forms a protective cover for the tendons 22. It is in the form of a duct which internally defines a cavity 24 running along the length of the cable 10 and within which the tendons 22 are arranged. The cross-section of the sheath 20 is typically circular. Other shapes, e.g. polygonal, elliptical, etc., are possible. The sheath 20 comprises an inner surface 28 facing the tendons 22. The inner surface 28 may be circular like the cross-section of the sheath 20.

The tendons 22 are arranged within the cavity 24 so that an interstitial space 26 is left accessible. The interstitial space 26 has a height H in range of 20 to 120 mm, for example of 30 to 100 mm. The interstitial space 26 extends within the sheath 20 and over the entire length of the sheath 20. Since the tendons 22 normally support the sheath 20, the interstitial space 26 is generally located below the tendons 22 within the sheath 20.

The cable 10 may have a length of up to several hundred meters. The bundle may include a few tens of tendons 22.

The sheath 20 is typically made of plastic material such as high-density polyethylene (HDPE).

Figure 3:
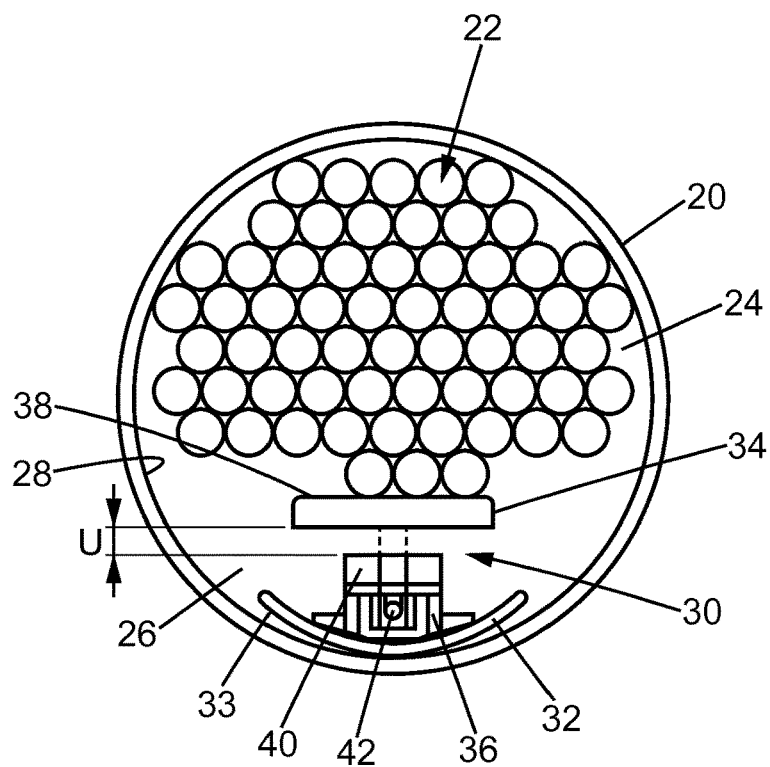
FIG. 3 is a cross-sectional view of the stay cable shown in FIG. 2 and an example of a deicing device arranged within the stay cable, the bearing element being in a bearing position.
Figure 4:
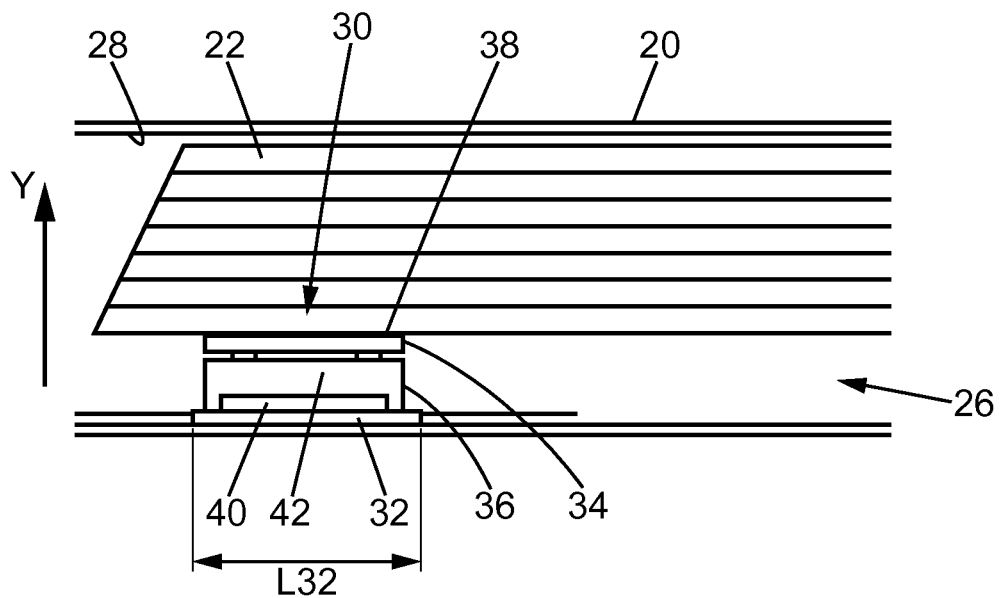
FIG. 4 is a view in a longitudinal cross-section of the stay cable and the deicing device shown in FIG. 3.

FIGS. 3 and 4 show the deicing device 30. The deicing device 30 acts locally from within the sheath 20 to remove the potentially accumulated ice, frost, rime or snow on its outer surface. Therefore, it should be understood the deicing device is not limited to remove ice: the word "deicing" is meant to cover the removal of any kind of frozen water.

The deicing device 30 is located in the interstitial space 26, between the inner surface 28 of the sheath 20 and the bottom side of the tendons 22. The deicing device has a length L32 which is in a range of 50 to 500 mm, and preferably in a range of 50 to 300 mm. The deicing device 30 comprises a base 32, a bearing element 34 and a power system 36.

The base 32 is the support of the deicing device 30. The base 32 is intended to lay on the inner surface 28 of the sheath 20. The base 32 is for example a metal part. Typically, the base 32 has a convex surface 33 that is in contact with the inner surface 28 of the sheath 20. The convex surface 33 faces the inner surface 28 of the sheath 20. In other words, the convex surface 33 may be concave with respect to bearing element 34 side, while being convex with respect to the inner surface 28 of sheath 20 side.

The convex surface 33 has a curvature larger than the curvature of the inner surface 28. In that way, the deicing device 20 is adapted to be displaced along the sheath 20, on the inner surface 33. More precisely, the base 32 is curvilinear and forms the convex surface 33. The width of the base 32 is defined by the curvilinear length of the base 32. The width of the base 32 depends on the height H of the interstitial space 26 available under the tendons 22. The curvilinear length is as long as possible without blocking the movement of the base 32 along the sheath 20, and to prevent the base 32 from turning over.

In addition, the base 32 may be connected to a displacement system. The displacement system may be a hoisting system connected to the high and the low ends of the base 32 and that can pull the deicing device 30 along the sheath 20. The hoisting system may be located in the vicinity of the anchoring devices 16, 18 of the cable 10. Alternatively, the hoisting system is directly integrated to the deicing device 30. For example, the hoisting system comprises rollers surrounding a guiding rope/cable, the guiding rope serves as a guide and support for the displacement of the deicing device 30 along the sheath. The rollers may be motor-driven with motor integrated to the deicing device. In the case of a cable-stayed bridge, the hoisting system may comprise winches with a capacity between 50 and 500 kg, which are installed at the bottom of the cable 10 on the deck, and at the head of cable on or in the pylon. In addition, the displacement system may comprise a guide wire provided along the sheath 20 and connected to the deicing device 30 to prevent the deicing device 30 from turning over in the interstitial space.

The bearing element 34 is intended to contact one or more tendons 22. For example, the bearing element 34 is a shoe with an external surface 38. The shoe is pressed against the tendons 22. More precisely, the external surface 38 is in contact with the tendons 22. The external surface 38 is for example made of plastic. In another example, the external surface 38 is made of rubber or any other material that can prevent damage to the tendons 22. Actually, the bearing element 34, when contacting tendons 22, exerts a pressing force on the tendons 22 so that the deicing device 30 is firmly supported on the bundle of tendons 22. By "pressing force" it should be understood that the bearing element 34 exerts on the tendons 22 a non-zero force (i.e. different from zero). For example, the force applied on the tendons is more than 10N, and preferably in a range of 100N to 10 kN. The applied force may be measured for example with a dynamometer integrated in the deicing device 30. If the force applied is more than a threshold value corresponding to a sufficient pressing force applied on the tendons 22, a vibrator 42 of the deicing device 30 may be activated.

Figure 5:
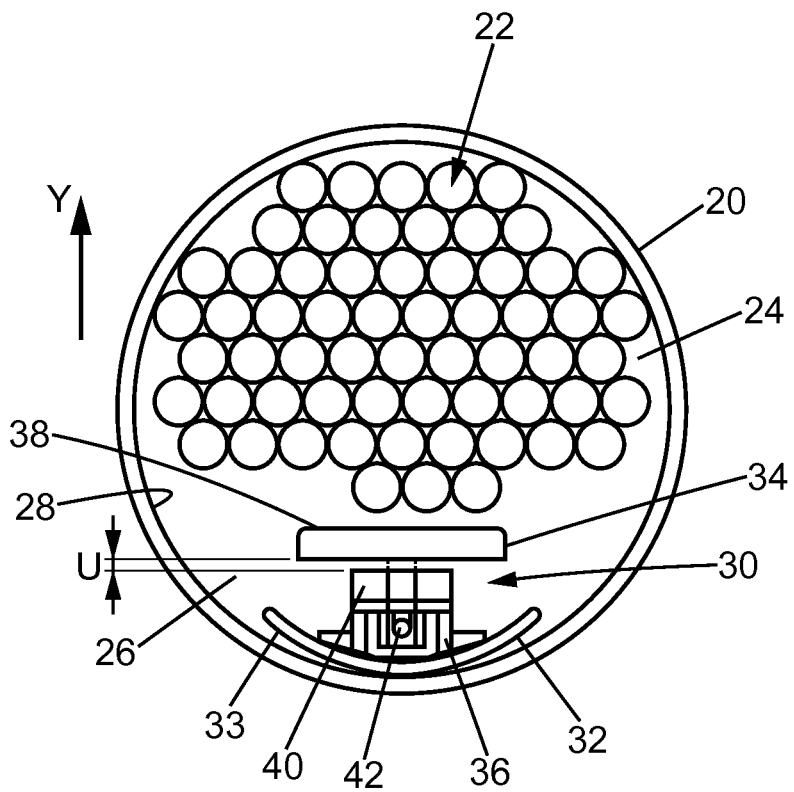
FIG. 5 is the cross-sectional view of the FIG. 3, the bearing element being in a rest position.

The bearing element 34 is movable between a rest position (FIG. 5) and a bearing position (FIG. 3). In the rest position, the bearing element 34 does not contact or barely contacts the tendons 22. In other words, in the rest position, the bearing element 34 does not exert a pressing force on the tendons 22. In the bearing position, the bearing element 34 contacts tendons 22 and it exerts a pressing force on the tendons 22. The movement of the bearing element 34 between the rest position and the bearing position is according a direction Y, the direction Y being perpendicular to the inner surface 28 of the sheath. The movement of the bearing element 34 is radial (and transversal) with respect to the longitudinal direction of the tendons 22 and the sheath 20. More precisely, regarding the deicing device 30, the bearing element 34 can move with respect to the base 32, perpendicularly to the convex surface 33. The bearing element 34 can thus move away and towards the base 32. There is therefore a relative movement between the bearing element 34 and the base 32. The movement of the bearing element 34 is actuated by the power system 36, as detailed here below.

The power system 36 is configured to press the bearing element 34 against the tendons 22 while the base 32 is in contact with the inner surface 28 of the sheath 20. In an embodiment, it is further configured to generate vibrations between the bearing element 34 and the base 32. For this purpose, the power system 36 comprises an actuator 40 for the movement of the bearing element 34. The actuator 40 may be for example a cylinder. The cylinder is preferably electric, or hydraulic or pneumatic. The actuator 40 may also be a scissor or pantograph mechanism, an elliptical cam rotated by a low speed motor or any other mechanical system causing a translation.

The stroke U of the actuator 40 is in a range of 3 to 75 mm, and preferably in a range of 5 to 30 mm.

The power system 36 may be powered by a remote power source at the end of the cable 10. In that configuration, the power cable may be wound with the hoisting system, in the case where a hoisting system is provided. According to another embodiment, the power system 36 may be powered by a battery embedded in the deicing device 30. In that case, the base 32 can hold the embedded circuitry for control and power supply. Alternatively, the deicing device 30 may be controlled by a remote control, for example from a control station next to the construction.

Figure 6:
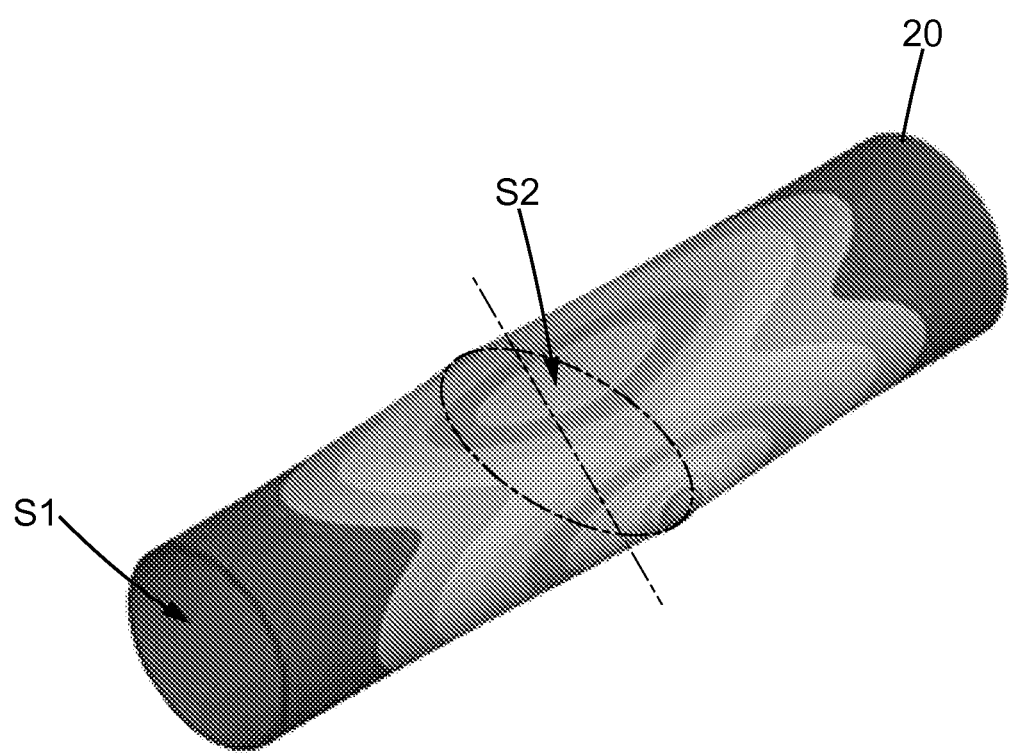
FIG. 6 is a perspective view of the stay cable with a deicing device arranged within the bearing element being in a bearing position.

The actuator 40 is firmly attached to the bearing element 34 and the base 32. The actuator 40 allows pressing the bearing element 34 against the tendons 22. Since the base 32 is in contact with the sheath 20 the exerted pressure on the tendons 22 causes a local deformation of the sheath 20. More precisely, the actuator 40 produces a radial force against the tendons 22, preferably vertical, up to a slight deformation of the sheath 20, which can then cause a temporary and reversible shape change of the circular section S1 of the sheath 20 to a substantially elliptical or oval section S2, illustrated in FIG. 6. Given the difference in stiffness between the ice and the sheath 20, some lamella of air can be created on the contacting surface between the cable and the ice, thereby the adhesion of ice on the cable is broken. Therefore, this deformation may be a first step of local detachment of the ice for ejection.

In addition, the actuator 40, when the power system 36 comprises additionally a vibrator 42 (which will be detailed below), clamps the movements of the base 32 before activation of the vibrator 42 to prevent damage to the tendons 22 under the effect of movement of the base 32 under vibrations. The clamping of the base 32 and the bearing element 34 may be optimally obtained for example thanks to a dynamometer as detailed above. In this clamping position, the deicing device 30 and the sheath 20 contact each other with a high rigidity. In other words, the rigidity is controlled by the force applied on the tendons 22. The vibrator 42 is thereby rigidly connected with the sheath 20, allowing an optimal transmission of the vibrations to the snow, frost or ice which covers the cable through the base 32 and the sheath 20 with low energy dissipation.

The power system 36 may also comprise a vibrator 42. The vibrator 42 generates vibrations, for example in a range of 50 to 5000 Hz, and preferably in a range of 100 to 1000 Hz. The vibrator 42 is for example an electromagnetic loudspeaker with a power of preferably between 50 and 500 W. The vibrator 42 may also be a piezoelectric element. In another example, the vibrator 42 is an eccentric or cam rotated at a speed in a range of 5000 to 35000 rpm, and preferably of 10000 rpm to 30000 rpm (i.e. 166 Hz to 500 Hz).

In addition, the assemblies of the vibrator 42 and the actuator 40 with the base 32 have a significant stiffness so as to minimize the energy dissipation during the activation of the vibrator.

The deicing device is not limited to the features detailed here above. Indeed, the deicing device may comprise others features, taken alone or in combination:
- the base 32 may comprise a plurality of supporting points along its length L32, i.e. the base 32 contacts the inner surface 28 of the sheath 20 by these supporting points;
- the deicing device 30 may comprise a plurality of bases 32, and a bearing element 34;
- the deicing device 30 may comprise a plurality of bearing elements 34, and a base 32;
- the deicing device may comprise a plurality of power system 36.

In addition, the deicing device may be connected to other deicing devices aligned along a longitudinal direction of the sheath 20, i.e. aligned behind each other along the longitudinal direction of the sheath 20. In another example, the deicing devices may be arranged in the interstitial space 26, but each deicing device having a different radial position.

Figure 7:
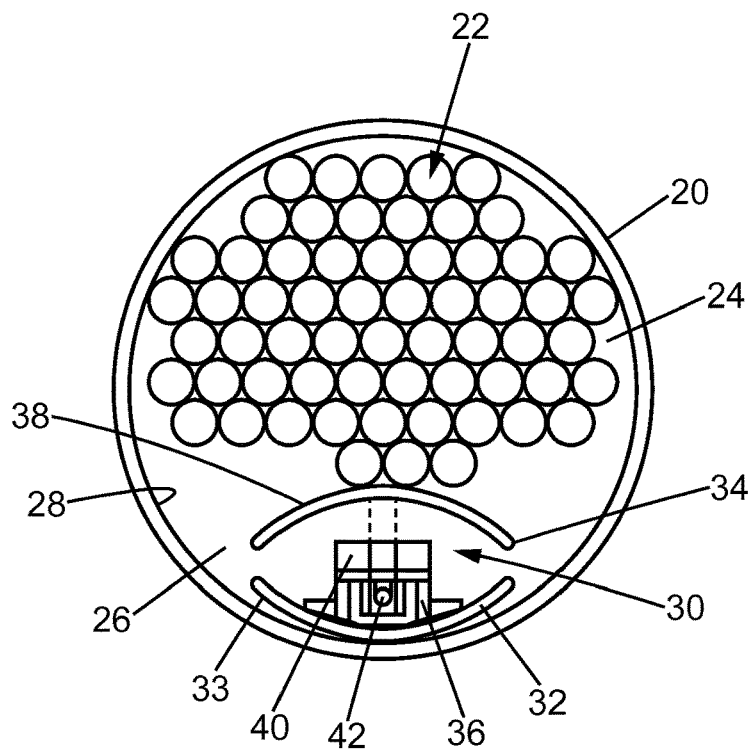
FIG. 7 is a cross-sectional view of the stay cable as in FIG. 3 provided with another example of a deicing device.
Figure 8:
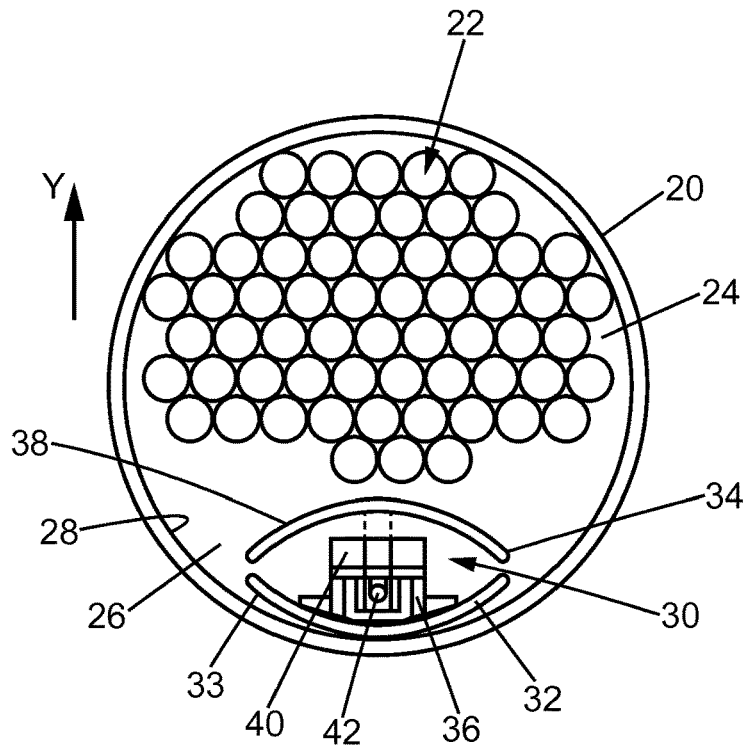
FIG. 8 is the cross-sectional view of the FIG. 7, the bearing element being in a rest position.

FIGS. 7 and 8 illustrate another example of the deicing device 30. In this example, the bearing element 34 differs from the one of the deicing device 30 previously described. Indeed, in this configuration, the base 32 and the bearing element 34 are identical: so as the base 32, the bearing element 34 as a curvilinear shape that allows to the base 32 and the bearing element 34 to be indifferently placed against the inner surface 28 or the tendons 22. Preferably, the bearing element 34 and the base 32 are made in the same material, such as plastic, for example polyamide. Therefore, the deicing device 30 can be placed within the interstitial space 26 without having to match the base 32 on the inner surface 28 and the bearing element 34 on the tendons 22. In this configuration, the bearing element 34 and the base 32 can be defined as such only relative to the position of the deicing device 30 in the interstitial space 26.

In the following description, a method for deicing a sheath 20 is described. The method uses the above-described deicing device 30. In an embodiment, it comprises the following steps:
- inserting the deicing device 30 within the sheath 20 of the structural cable 10;
- bringing the deicing device 30 at a first required position along cable 10 and sheath 20;
- pressing the bearing element 34 against the tendons 22 while the base 32 is in contact with the inner surface 28 of the sheath 20. The pressing step can be done by moving the bearing element 34 in the direction Y, for example by applying a pressure to the bearing element 34;
- alternatively, generating vibrations in the deicing device 30 during 1 to 15 seconds;
- releasing the pressure applied on the tendons 22;
- displacing the deicing device 30 along the sheath 20, for example over a distance greater than the length L32 of the deicing device 30; and
- pressing again the bearing element 34 against the tendons 22 at another position along the sheath 20.

Alternatively, while the bearing element 34 is pressed against the tendons 22, the method comprises applying a pressure pulse by the bearing element 34. The pressure pulse is applied as a pressure force variation, possibly fast, to be transmitted to the ice or snow covering the cable sheath, useful for example in a first step of local detachment of the ice for ejection. The pressure pulse is actually a variation of the pressing force on the tendons 22. The pressing force is therefore always above the threshold value corresponding to a sufficient pressing force applied on the tendons 22, so that the power system 36 permanently presses the bearing element 34 against the tendons 22. For example, the pressing force minimum value is above 10N, and its maximum value remains within the range of 100N to 10 kN. In addition, one or more pressure pulse may be applied to the cable while the bearing element 34 is pressed against the tendons 22.

For example, the method consists of first placing the deicing device 30 at one position along the sheath 20. More precisely, the deicing device is placed in the interstitial space 26 of the sheath 20, for example apart from the tendons 22, with the base 32 of the deicing device 30 laying on the inner surface 28 of the sheath 20. In an inactive state of the device 30, the bearing element 34 is in a rest position. When deicing (or the removing of snow, frost or rime) is needed, the deicing device 30 is activated. Beforehand, when the deicing device is not in the appropriate location for the deicing action, the deicing device 30 is displaced along the inner surface 28 of the sheath 20. By its activation, the actuator 40 moves the bearing element 32 in the perpendicular direction Y, from the base 32 to the tendons 22. The bearing element 34 is thus pressed against the tendons 22 while the base 32 is in contact with the inner surface 28 of the sheath 20. The bearing element 32 is therefore in the bearing position. The actuator 40 thus presses the bearing element 34 against the tendons 22 such that the deicing device 30 is firmly maintained against the sheath 20 and the tendons 22.

Once the deicing device 30 is placed between the tendons 22 and the inner surface 28 of the sheath 20 (and therefore while the bearing element 34 presses the tendons 22), the vibrator 42 may be activated for a few seconds, for example 1 to 15 seconds, and preferably 1 to 10 seconds. Activation of the vibrator 42 results in fragmentation of the ice over a length of 20 cm to 200 cm of the sheath 20 and up to several meters, for instance 5 meters.

To cover the entire length of the sheath 20, the deicing device 30 may be moved step by step along the sheath 20 via the displacement system preferably automated and remotely controllable. Before moving the deicing device 30 along the sheath 20, the actuator 40 stops the pressure of the bearing element 34 against the tendons 22 by moving the bearing element 32 in the perpendicular direction Y, from the tendons 22 to the base 32. The bearing element 32 is therefore back in the rest position. The deicing device 30 is then moved in another place along the sheath 20 where deicing is needed.

It will be appreciated that the embodiments described above are illustrative of the invention disclosed herein and that various modifications can be made without departing from the scope as defined in the appended claims.

The invention claimed is:

1. A deicing device for a sheath of a structural cable, the sheath having an inner surface, the structural cable comprising tendons housed in the sheath, the deicing device comprising:
    a base;
    a bearing element; and
    a power system configured to press the bearing element against the tendons while the base is in contact with the inner surface of the sheath.

2. The deicing device as claimed in claim 1, wherein the power system is further configured to generate vibrations between the bearing element and the base.

3. The deicing device as claimed in claim 1, wherein the bearing element is movable in a direction perpendicular to the inner surface of the sheath, with a stroke in a range of 3 to 75 mm.

4. The deicing device as claimed in claim 3, wherein the power system comprises an actuator for the movement of the bearing element in the perpendicular direction, the actuator being fixed to the base and to the bearing element.

5. The deicing device as claimed in claim 1, wherein the inner surface has a curvature and the base has a convex surface facing the inner surface of the sheath, the convex surface having the curvature larger than a curvature of the inner surface of the sheath.

6. The deicing device as claimed in claim 1, wherein the power system comprises a vibrator generating vibrations in a range of 50 to 5000 Hz.

7. A structural cable, comprising a sheath, tendons housed in the sheath, and at least one deicing device as claimed in claim 1 inserted in the sheath.

8. The structural cable as claimed in claim 7, wherein the at least one deicing device is placed under the tendons in the sheath.

9. The structural cable as claimed in claim 7, comprising a plurality of deicing devices aligned along a longitudinal direction of the sheath.

10. Method for deicing a sheath of a structural cable of a construction work, the sheath having an inner surface the structural cable comprising tendons housed in the sheath, the method comprising:
    inserting a deicing device within the sheath of the structural cable, the deicing device comprising a base and a bearing element;
    pressing the bearing element against the tendons while the base is in contact with an inner surface of the sheath.

11. The method as claimed in claim 10, wherein pressing the bearing element against the tendons comprises moving the bearing element in a direction perpendicular to the inner surface of the sheath.

12. The method as claimed in claim 10, further comprising:
    generating vibrations in the deicing device during 1 to 15 seconds.

13. The method as claimed in claim 10, wherein pressing the bearing element against the tendons comprises applying a pressure pulse by the bearing element.

14. The method as claimed in claim 10, further comprising:
    displacing the deicing device along the sheath; and
    pressing again the bearing element against the tendons while the base is in contact with the inner surface of the sheath at another position along the sheath.

15. The method as claimed in claim 14, wherein the deicing device is displaced over a distance greater than a length of the deicing device.

* * * * *